United States Patent [19]

Nakao et al.

[11] Patent Number: 5,559,766
[45] Date of Patent: Sep. 24, 1996

[54] ROTARY DRUM TAPE RECORDING APPARATUS WITH CONTROLLING OPTICAL RECORDING TRACKS USING STORED RESULTS OF SCANNING OF REFERENCE TRACKS

[75] Inventors: Takashi Nakao, Tokyo; Kiyoshi Ohsato, Chiba; Yoshiteru Kamatani, Kanagawa; Tatsuya Narahara, Kanagawa; Tadashi Ozue, Kanagawa, all of Japan

[73] Assignee: Sony Corporation, Tokyo, Japan

[21] Appl. No.: 500,028

[22] Filed: Jul. 10, 1995

Related U.S. Application Data

[63] Continuation of Ser. No. 225,511, Apr. 11, 1994, abandoned, which is a continuation of Ser. No. 925,763, Aug. 7, 1992, abandoned.

[30] Foreign Application Priority Data

Aug. 9, 1991 [JP] Japan ................................. 3-224569

[51] Int. Cl.⁶ .................................................. G11B 7/09
[52] U.S. Cl. .................................. 369/44.18; 369/44.25; 369/44.27; 369/44.34; 369/97
[58] Field of Search ................................ 369/44.25, 44.28, 369/44.26, 44.32, 44.18, 44.17, 44.11, 44.23, 44.27, 44.34, 97; 360/77.04; 346/135.1

[56] References Cited

U.S. PATENT DOCUMENTS

| | | | |
|---|---|---|---|
| 4,788,129 | 11/1988 | Bouldin et al. | 346/135.1 |
| 4,907,214 | 3/1990 | Nagano et al. | 360/77.04 X |
| 4,970,707 | 11/1990 | Hara et al. | 369/44.17 X |
| 5,155,720 | 10/1992 | Narahara et al. | 369/44.17 X |

FOREIGN PATENT DOCUMENTS 62-119719  1/1987  Japan.

*Primary Examiner*—W. R. Young
*Attorney, Agent, or Firm*—Jay H. Maioli

[57] ABSTRACT

An optical recording method and an optical recording apparatus enable recording information on recording tracks substantially corresponding to ideal reference tracks, on an optical recording medium without preformatted tracks. The optical recording medium is scanned by a rotating optical scanning system using a scanning light beam emitted by an external light source to record information on the optical recording medium. Prior to recording the information on the optical recording medium, information recorded on a reference track recording medium provided with ideal reference tracks is reproduced in a tracking control mode to acquire tracking control data and the tracking control data is stored in a waveform memory. In recording information on the optical recording medium, the rotating optical scanning system is controlled on the basis of the previously stored tracking control data so that the scanning spot traces recording tracks corresponding to the ideal reference tracks.

3 Claims, 5 Drawing Sheets

ROTARY DRUM TAPE RECORDING APPARATUS WITH CONTROLLING OPTICAL RECORDING TRACKS USING STORED RESULTS OF SCANNING OF REFERENCE TRACKS

This is a continuation of application Ser. No. 08/225,511 filed Apr. 11, 1994, now abandoned, which is a continuation of application Ser. No. 07/925,763, filed Aug. 7, 1992, now abandoned.

BACKGROUND OF THE INVENTION

1. Field of the Invention

The present invention relates to an optical recording method for recording information on an optical recording medium, such as an optical tape or an optical card, and an apparatus for carrying out the same.

2. Description of the Prior Art

A writable optical disk is provided with a preformatted tracks called pregrooves, which are used for tracking control in recording information on the optical disk. Therefore, nearly ideal recording tracks can be formed when ideal preformatted pregrooves are formed.

Optical recording/reproducing apparatus proposed in, for example, Japanese Patent Laid-open (Kokai) Nos. Sho 62-112234 and Sho 63-103440 use a flexible optical recording medium, such as an optical tape. In recording information on an optical tape by these prior art optical recording/reproducing apparatus, the optical tape is wound around the circumference of a rotary drum in a predetermined contact angle, and a light beam emitted by an external laser source is projected on the optical tape by a rotary optical scanning system comprising, as principal components, an image rotator (image rotating optical system), a mirror provided in the rotary drum, and an objective lens, and using a multibeam. As the rotary drum rotates, the light beam is turned so as to scan the optical tape. If the light beam is deviated from the axis of rotation of the rotary drum, the spot of the light beam on the optical recording medium is dislocated when the mirror rotates. This problem can be solved by an image rotator that turns an image about the optical axis.

The image rotator has a rotary member provided with an image rotating prism, such as a dove prism. The image rotating prism rotates the image of a stationary object through twice the angle of rotation of the rotary member. Accordingly, the image rotator rotates in synchronism with the rotary drum at a rotating speed half the rotating speed of the rotary drum. Thus, information is recorded, similarly to recording information for magnetic recording, on diagonal, straight tracks on the optical tape.

Generally, the optical tape used for optical recording is not provided with any pregrooves, i.e., preformatted reference tracks, which are formed on an optical disk. Accordingly, the linearity of the recording tracks on the optical tape is dependent on the mechanical accuracy of the recording apparatus and curved tracks are formed due to errors in the rotary component of the rotary optical scanning system including the image rotator and the rotary drum. If the period of an error causing the tracks to curve is equal to that of rotation of the rotary drum, parallel, curved tracks are formed because each track is formed while the rotary drum turns one full turn, and hence there is little possibility of crosstalk between the adjacent tracks.

Figure 7:
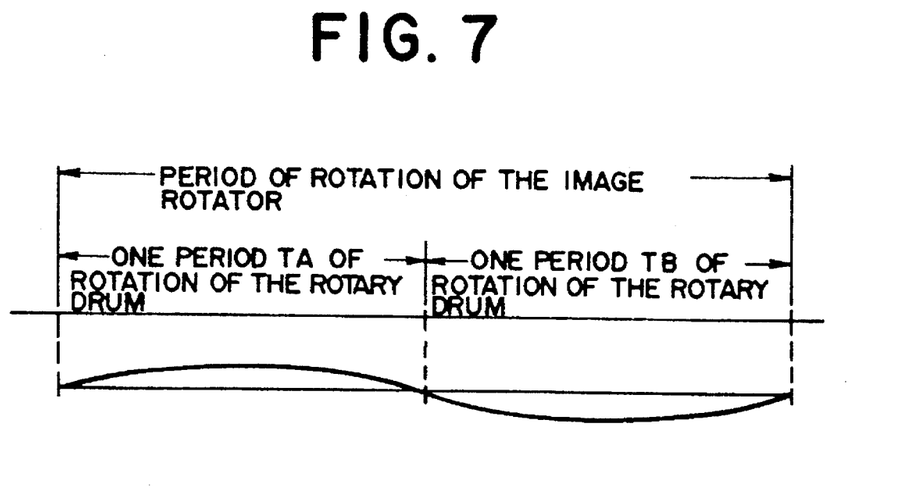
FIG. 7 is a diagram of assistance in explaining the relation between the period of rotation of an image rotator and that of rotation of a rotary drum.
Figure 8:
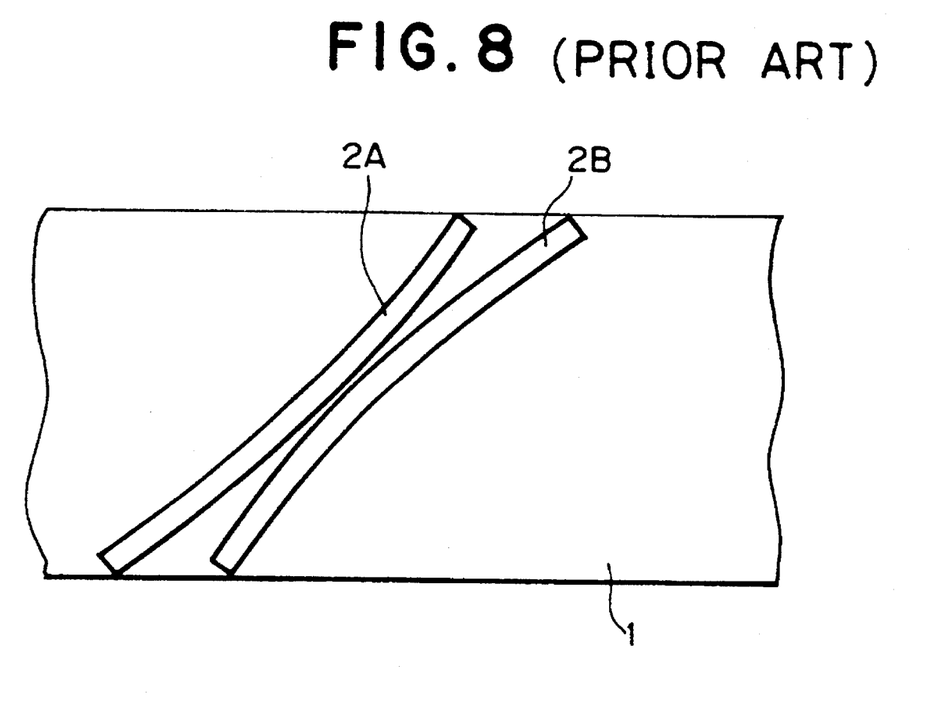
FIG. 8 is a diagrammatic view of assistance in explaining recording tracks formed by a prior art optical recording/reproducing apparatus.

However, as mentioned above, since the period of rotation of the image rotator is twice that of rotation of the rotary drum, the error ER causing the tracks to curve varies in a sinusoidal curve having a period twice that of rotation of the rotary drum. Consequently, the effect of the error ER on curving a track in one period TA of rotation of the rotary drum and the effect of the same on curving a track in the subsequent period TB of rotation of the rotary drum are reverse to each other as shown in FIG. 7 and the curvature of a track 2A formed in the period TA and that of a track 2B formed in the subsequent period TB are reverse to each other as shown in FIG. 8. Crosstalk is liable to occur between such adjacent tracks 2A and 2B curving in opposite directions.

The error in the image rotator causing such track curvature is attributable to the unsatisfactory accuracy of the dove prism, which can not be improved even by optical position adjustment with high accuracy. Accordingly, the track pitch must be increased to obviate crosstalk, which, however, reduces recording density.

If such track curvature is characteristic of a recording apparatus, load on the servo system of a recording/reproducing apparatus will be increased in reproducing information recorded on an optical tape recorded by another recording/reproducing apparatus. Such a problem arises also when the period of the error is equal to that of rotation of the rotary drum.

The same problems arises in reproducing information recorded on an optical tape by a recording/reproducing apparatus employing a polygonal rotating mirror, such as a recording/reproducing apparatus disclosed in Japanese Patent Laid-open (Kokai) No. Sho 61-34740 or Sho 62-162261, because positional errors in the reflecting faces of the polygonal rotating mirror and the difference in optical aberration between the reflecting faces of the polygonal rotating mirror are characteristic of the polygonal rotating mirror, and the form of tracks is dependent on the characteristics of the polygonal rotating mirror.

SUMMARY OF THE INVENTION

The present invention has been made in view of the foregoing problems in the prior art and it is therefore an object of the present invention to provide an optical recording method capable of recording information on an ideal, straight recording track which is not curved, and to provide an apparatus for carrying out the optical recording method.

In one aspect of the present invention, an optical recording method of recording information on an optical recording medium by scanning the optical recording medium by a rotary optical scanning system using a light beam emitted by a light source comprises the steps of: reproducing information recorded on ideal reference tracks on a reference track recording medium, prior to recording information on an optical recording medium to acquire tracking control data when preformatted reference track signals are unavailable from the optical recording medium; storing the tracking control data for tracking control acquired through the reproducing operation for reproducing the information recorded on the reference track recording medium; and recording information on the optical recording medium so that the information is recorded on recording tracks on the optical recording medium corresponding to the reference tracks under tracking control using the previously stored tracking control data.

Thus, the information can be surely recorded on recording tracks substantially the same as the ideal tracks. Accordingly, the recording tracks can be formed at sufficiently small track pitches without entailing crosstalk between the adjacent recording tracks and the information recorded by a recording/reproducing apparatus can be satisfactorily reproduced by another recording/reproducing apparatus. Furthermore, the optical system of the recording/reproducing apparatus does not need highly accurate adjustment because the optical recording method of the present invention eliminates the effect of errors remaining in the optical system.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
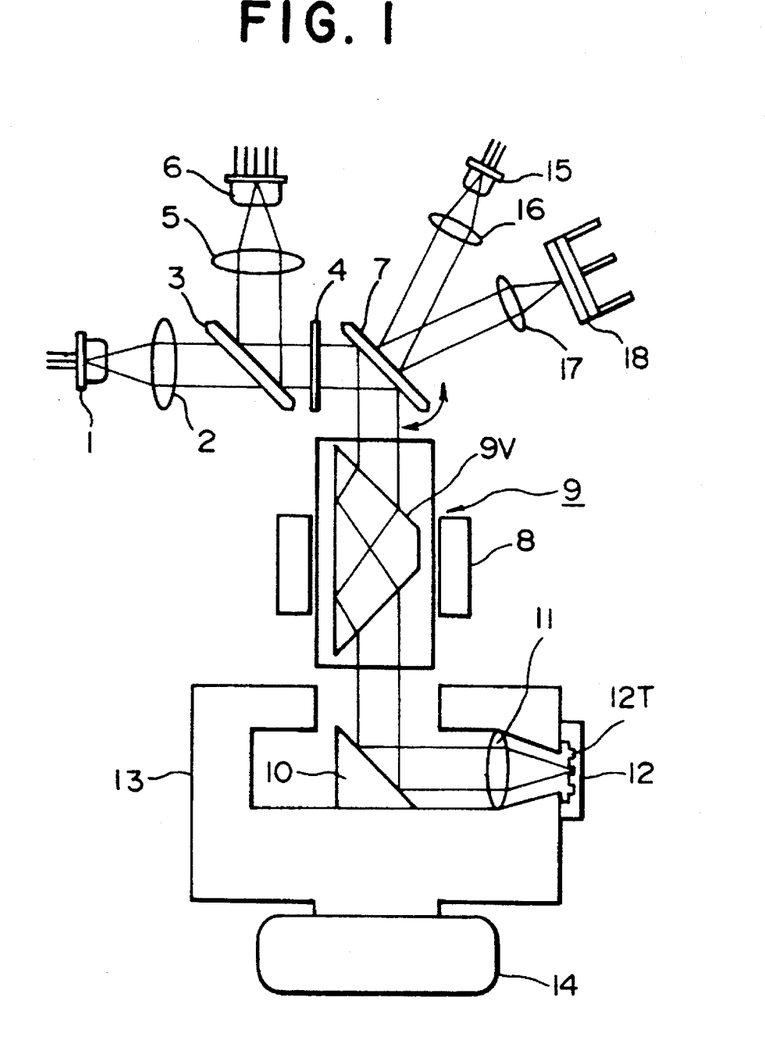
FIG. 1 is a diagrammatic view of an optical system included in an optical recording apparatus in a first embodiment according to the present invention.

Referring to FIG. 1 showing an optical system included in an optical recording apparatus in a first embodiment according to the present invention, laser light emitted by a semiconductor laser 1, i.e., a light source, is collimated by a collimating lens 2 into a parallel laser beam, the laser beam travels through a polarizing beam splitter 3 and a quarter-wave plate 4, falls on and is reflected by a galvanomirror 7 and falls on an image rotator 9 provided with a dove prism 9v. The laser beam outgoing from the image rotator 9 is reflected by a mirror 10 provided within a rotary drum 13, and then the reflected laser beam is focused by an objective lens 11 in a scanning spot on an optical tape, not shown, wound around the rotary drum 13. The laser beam reflected by the optical tape travels along the optical path in the reverse direction and is guided by the quarter-wave plate 4 and the polarizing beam splitter 3 toward a signal detecting system comprising a focusing lens 5 and a multielement detector 6.

The rotary drum 13 is driven for rotation by a drum motor 14. The dove prism 9v of the image rotator 9 is fixed to the output shaft of a rotator motor 8, and the rotator motor 8 rotates the dove prism 9v synchronously with the rotary drum 13. As mentioned above, the synchronous rotating speed of the image rotator 9 is half the rotating speed of the rotary drum 13.

The galvanomirror 7 is turned in the directions of the arrows to regulate the angular position of the optical axis to regulate the position of the scanning spot on the optical tape with respect to track control directions, i.e., directions along the width of the recording track and perpendicular to the track scanning direction. The position of the scanning spot with respect to the track scanning direction is controlled by the galvanomirror 7 and the image rotator 9.

The angular position of the galvanomirror 7 is detected by the following method. Light emitted by an LED 15 is collimated by a collimating lens 16 in a parallel light beam, and the parallel light beam falls on the backside of the galvanomirror 7. The light beam reflected by the backside of the galvanomirror 7 is focused by a focusing lens 17 on a position detector 18 comprising a one-dimensional CCD line sensor. The position of the spot of the light beam on the position detector 18 corresponds to the angular position of the galvanomirror 7. The position detector 18 provides a position detection signal representing the angular position of the galvanomirror 7.

If an optical disk provided with preformatted tracks (grooves) is used, light reflected by the preformatted track is received by a multielement detector 6 included in a signal detecting system, a tracking error signal is produced on the basis of the output signal of the multielement detector 6 and the angular position of the galvanomirror 7 is controlled according to the tracking error signal for tracking control so that spot of the recording light beam traces the preformatted track. Thus, information can be recorded on substantially ideal recording tracks. However, since the optical tape is not provided with any preformatted tracks, tracking control is impossible and therefore track curvature occurs due to scanning errors resulting from mechanical errors.

According to the present invention, scanning error correcting data for correcting the position of the scanning spot so that the scanning spot traces ideal recording tracks correctly is stored beforehand and tracking control is executed on the basis of the scanning error correcting data to eliminate scanning errors in recording information on an optical tape.

Figure 2:
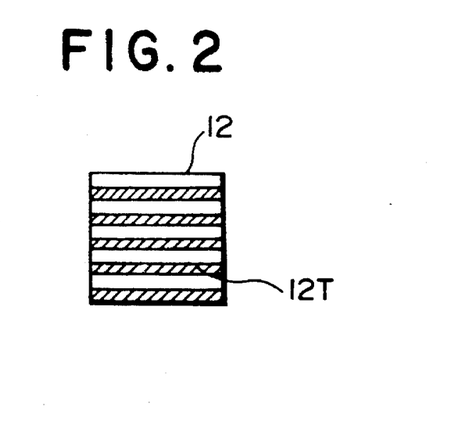
FIG. 2 is a view of a reference track tag.

A procedure of obtaining the scanning error correcting data will be described hereinafter. A reference track tag 12 is provided with a plurality of ideal reference tracks (grooves) 12T arranged at equal intervals. The reference tracks are straight. There is no restriction on the size of the reference track tag 12 provided that a scanning spot can be formed on the reference track tag 12; the size may be such that the reference track tag 12 covers the entire circumference of the rotary drum 13. The reference track tag 12 is attached to the rotary drum 13 with the ideal tracks 12T extending along the ideal track scanning direction of the scanning spot. The optical recording apparatus is operated for reproducing operation and tracking control is executed so that the scanning spot scans the reference tracks 12T correctly. The multielement detector 6 provides tracking error signals representing the deviation of the scanning spot from the reference tracks 12T, and the galvanomirror 7 is turned so that the tracking error signals are reduced to zero. The position detector 18 provides angular position signals representing the angular positions of the galvanomirror 7. Then, mirror angular position data represented by the angular position signals provided by the position detector 18 is stored in combination with the corresponding rotator angular position data representing the angular positions of the image rotator 9, respectively, in a storage device.

The reference track tag 12 is removed from the rotary drum 13 and an optical tape is wound around the rotary drum 13 through a predetermined contact angle, for example, 180°, before starting a practical information recording operation. The contact angle is optional; the contact angle may be, for example, 360°. The mirror angular position data corresponding to the angular positions of the image rotator 9 is retrieved from the storage device in synchronism with the rotation of the image rotator 9 to drive the galvanomirror 7 according to the mirror angular position data. Consequently, the scanning spot scans the optical tape along straight recording tracks corresponding to the reference tracks 12T of the reference track tag 12.

Figure 3:
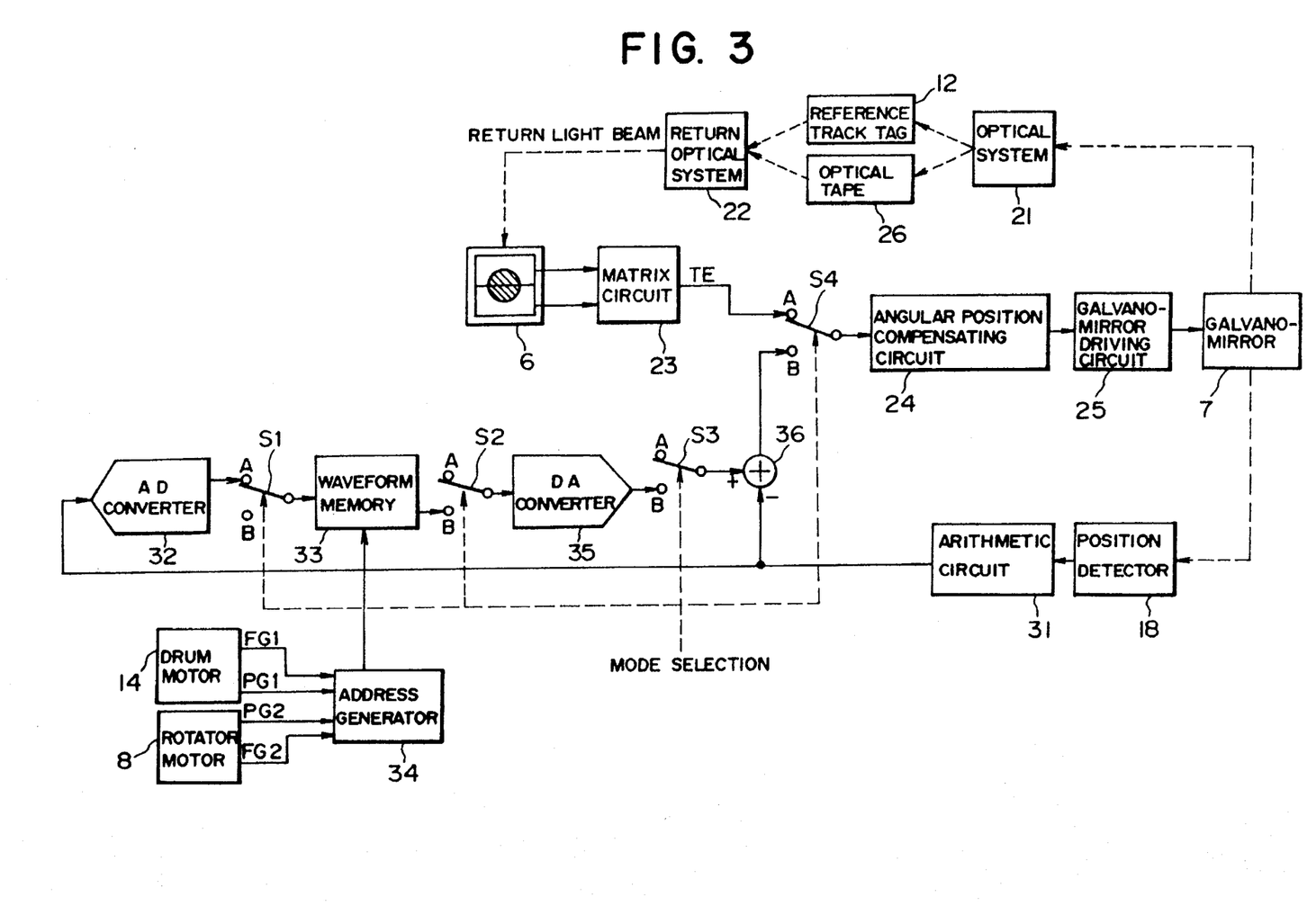
FIG. 3 is a block diagram of the optical recording apparatus in the first embodiment.

Referring to FIG. 3 showing the optical recording apparatus in a block diagram, the respective movable contacts of mode selector switches S1, S2, S3 and S4 are connected respectively to contacts A to select a mirror angular position data acquisition mode for acquiring the mirror angular position data, and the movable contacts are connected respectively to terminals B to select a recording mode for recording information on the optical tape. The reference track tag 12 is attached to the rotary drum 13 in the mirror angular position data acquisition mode, and the optical tape is wound around the rotary drum 13 in the recording mode. In the mirror angular position data acquisition mode, the laser beam emitted by the semiconductor laser 1 and reflected by the galvanomirror 7 is projected on the reference track tag 12 by the optical system 21 comprising the image rotator 9, the mirror 10 and the objective lens 11. The laser beam reflected by the reference track tag 12 is guided to the multielement detector 6 by a return optical system 22 including the galvanomirror 7.

The output of the multielement detector 6 is applied to a matrix circuit 23, and then the matrix circuit 23 determines tracking errors TE. The tracking errors TE are sent through the switch S4 and an angular position compensating circuit 24 to a galvanomirror driving circuit 25. Then, the galvanomirror driving circuit 25 turns the galvanomirror 7 for tracking control so that the scanning spot traces the reference track 12T on the reference track tag 12. The angular position of the galvanomirror 7 detected by the angular position detector 18 is converted into a corresponding angular position signal by an arithmetic circuit 31, the angular position signal is converted into a digital angular position data by an AD converter 32, and then the digital angular position data is transferred through the switch S1 to a waveform memory 33 for storage. The waveform memory 33 is set for a write mode in the mirror angular position data acquisition mode and is set for a read mode in the recording mode.

An address generator 34 provides an address signal for the waveform memory 33. The drum motor 14 gives a pulse signal PG1 indicating the angular position of the rotary drum 13 and a frequency signal FG1 indicating the rotating speed of the rotary drum 13 to the address generator 34. The rotator motor 8, which operates synchronously with the drum motor 14, gives a pulse signal PG indicating the angular position of the image rotator 9 and a frequency signal FG2 indicating the rotating speed of the image rotator 9 to the address generator 34. Then, the address generator 34 provides an address signal corresponding to the angular position of the image rotator 9. The image rotator 9 has N angular positions at equal angular intervals. The address signal represents each angular position.

In the mirror angular position data acquisition mode, the mirror angular position data representing the angular positions of the galvanomirror corresponding to the N angular positions of the image rotator 9 is written in the waveform memory 33 according to the address signal provided by the address generator 34. Thus, angular position waveform data representing the angular positions of the galvanomirror 7, for positioning the galvanomirror 7 so that the scanning spot scans the reference tracks in each turn of the image rotator 9 is stored in the waveform memory 33.

In the recording mode, an optical tape 26 is wound around the rotary drum 13 in the foregoing manner and the angular position waveform data is read from the waveform memory 33 according to the address signal provided by the address generator 34. Since the respective movable contacts of the switches S1 to S4 are connected to the contacts B, the angular position waveform data is applied through the switch S2 to a DA converter 35, the DA converter 35 converts the angular position waveform data into corresponding analog angular position signals, the analog angular position signals are transferred through the switch S3 to a sub-tracter 36. The analog angular position signals serve as reference angular position signals. The arithmetic circuit 31 gives an angular position signal representing the angular position of the galvanomirror 7 to the subtracter 36. Then, the subtracter 36 provides an error signal representing the difference between the angular position of the galvanomirror 7 represented by the angular position signal, and the reference angular position represented by the reference angular position signal., i.e., a signal representing the error in the angular position of the galvanomirror 7 relative to the reference angular position. The error signal provided by the subtracter 36 is sent through the switch S4 and the angular position compensating circuit 24 to the galvanomirror driving circuit 25 to correct the angular position of the galvanomirror 7. Consequently, in the recording mode, the scanning spot traces straight tracks on the optical tape corresponding to the reference tracks 12T on the reference track tag 12.

Although this embodiment stores the mirror angular position data representing the angular positions of the galvanomirror 7 for making the scanning spot trace tracks corresponding to the reference tracks in the waveform memory 33 in combination with the rotator angular position data representing the angular positions of the image rotator 9, tracking errors TE determined by the matrix circuit 23 in scanning the reference tracks 12T of the reference track tag 12 may be stored in the waveform memory 33 in combination with the rotator angular position data representing the angular positions of the image rotator 9.

Figure 4:
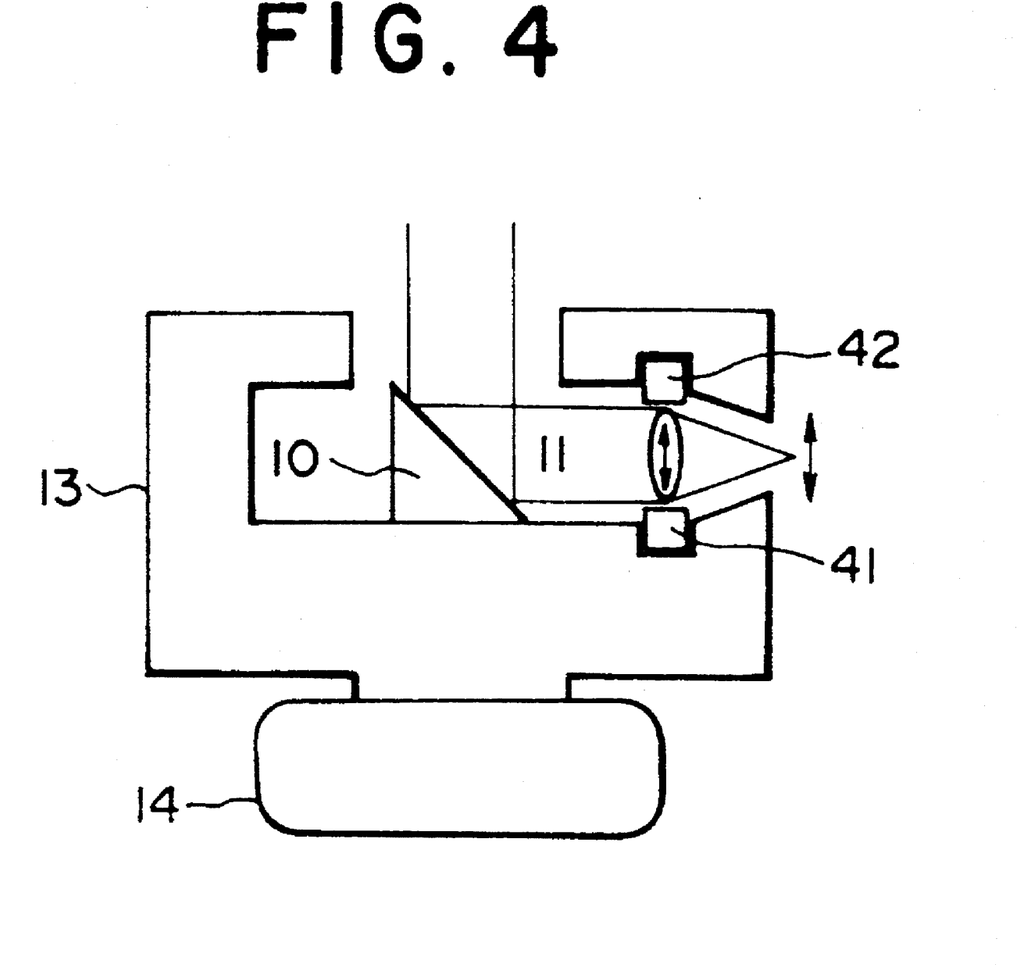
FIG. 4 is a diagrammatic view of an essential portion of an optical system included in an optical recording apparatus in a second embodiment according to the present invention.

The tracking control need not be limited to the control of the angular position of the galvanomirror 7. For example, as shown in FIG. 4, the objective lens 11 may be shifted in the direction of the arrows for tracking control with a piezoelectric element 41 or the like and the position of the objective lens 11 may be detected by a position detector 42. In this case, the position of the objective lens 11 with respect to directions in which the objective lens 11 is shifted for tracking control in making the scanning spot trace the reference tracks 12T of the reference track tag 12 may be stored in a memory in combination with the angular positions of the image rotator 9.

Figure 5:
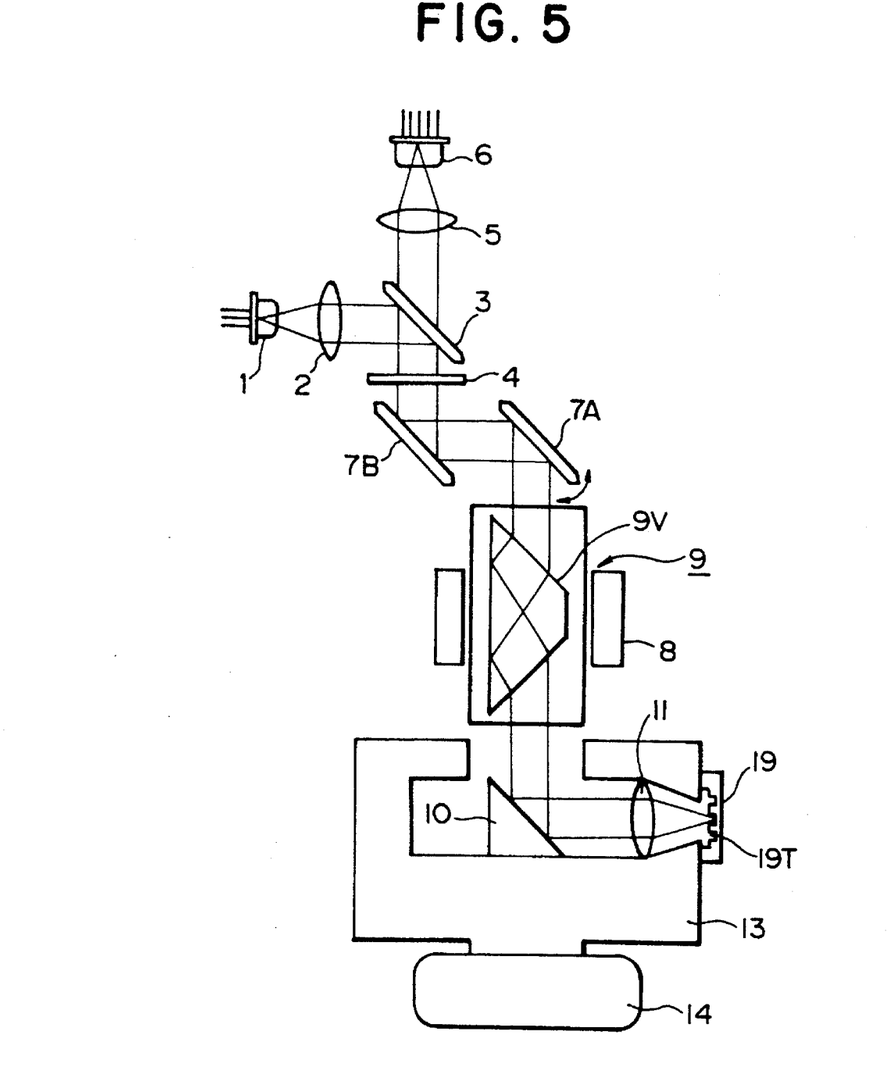
FIG. 5 is a diagrammatic view of an optical system included in an optical recording apparatus in a third embodiment according to the present invention.

FIG. 5 shows an optical system included in an optical recording apparatus in a second embodiment according to the present invention. This optical system is capable of detecting the dislocation of the scanning spot with respect to directions perpendicular to the tracking control directions as well as the dislocation of the scanning spot with respect to the tracking control directions.

The optical system of this optical recording apparatus is basically the same in construction as the optical system of the optical recording apparatus in the first embodiment, except that the optical system of the optical recording apparatus in the second embodiment is provided with a first galvanomirror 7A for controlling the position of the scanning spot with respect to the tracking control directions, and a second galvanomirror 7B for controlling the position of the scanning spot with respect to directions perpendicular to the tracking control directions, and two mirror angular position detecting devices, not shown, for detecting the respective angular positions of the first galvanomirror 7A and the second galvanomirror 7B. Each mirror angular position detecting devices comprises, similarly to that shown in FIG. 1, an LED, a collimating lens, a focusing lens and a line sensor.

Figure 6:
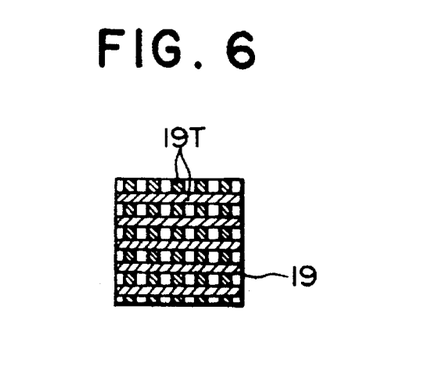
FIG. 6 is a view of a reference track tag to be used by the optical system of FIG. 5.

The optical recording apparatus employs a reference track tag 19 provided with straight reference tracks 19T arranged in a net-like pattern consisting of perpendicularly intersecting reference tracks as shown in FIG. 6. The reference track tag 19 is attached to the rotary drum, the optical recording apparatus is operated in the reproducing mode, the two galvanomirrors 7A and 7B are controlled so that positional errors with respect to the tracking control directions and the scanning directions are reduced to zero, and the respective angular positions of the galvanomirrors 7A and 7B corresponding to the correct position of the scanning spot are stored respectively in two waveform memories in combination with the corresponding angular positions of the image rotator 9.

In the recording mode, the angular position data is read from the two waveform memories and the angular positions of the galvanomirrors 7A and 7B are controlled on the basis of the angular position data. Thus, the scanning spot traces tracks substantially corresponding to the reference tracks for recording information on the optical tape, and the dislocation of the scanning spot on the time axis with respect to the scanning directions, i.e., jitter, can be eliminated in recording information on the optical tape. The position of the objective lens may be controlled instead of controlling the angular positions of the galvanomirrors 7A and 7B for tracking control.

The image rotators of the foregoing embodiments employing a dove prism may be substituted by an image rotating system other than those employing a dove prism.

The present invention is not limited in its application to an optical recording apparatus employing an image rotating optical system; the present invention is applicable to an optical recording apparatus that causes track curvature dependent on the angular position of a rotating optical scanning system. In a rotating optical scanning system employing a polygonal rotating mirror, scanning beams reflected respectively by the reflecting faces of the polygonal rotating mirror will trace different tracks, respectively, if there are errors in the orientation of the reflecting faces. The present invention eliminates the effect of such errors in the orientation of the reflecting faces of the polygonal rotating mirror to form satisfactorily straight recording tracks.

The correction signal generating means for generating correction signals to correct the position of the scanning spot so that ideal recording tracks may be formed may be provided, instead of the waveform memory, with a fixed wave generator capable of regulating the amplitude, waveform and phase of a wave.

The present invention is applicable to recording information on an optical recording medium, such as an optical card, other than an optical tape, and to an optical recording apparatus which does not employ a rotary drum. Ideal tracks are not necessarily straight tracks, but may be tracks having the shape of a circular arc.

Although the invention has been described in its preferred embodiments, obviously many changes and variations are possible therein. It is therefore to be understood that the present invention may be practiced otherwise than as specifically described herein without departing from the scope and spirit thereof.

What is claimed is:

1. A method of recording information on an optical recording tape trained about a rotary drum and formed without preformatted recording tracks by scanning the optical recording tape by a scanning system using a light beam emitted by a light source, said scanning system including a mirror and an image rotator, said method comprising the steps of:

reflecting the light beam from the light source to the image rotator by using the mirror;

rotating the image rotator at half the rotary speed of the rotary drum;

reflecting the light beam from the image rotator to the rotary drum and thence to the optical recording tape;

training about the rotary drum an optical reference track tape having ideal reference tracks formed thereon;

reproducing information recorded on the ideal reference tracks in a tracking control mode to acquire tracking control data prior to recording information on the optical recording tape;

storing the tracking control data for tracking control;

controlling an angular position of the mirror according to the tracking control data; and removing the optical reference track tape and training the optical recording tape about the rotary drum and recording information on recording tracks thereon based on the stored tracking control data, said recording tracks being formed so that they conform to the reference tracks under tracking control using the previously stored tracking control data.

2. An optical recording apparatus for recording on and reproducing from an optical recording tape formed without preformatted recording tracks, comprising:

a light source that emits a scanning beam;

an optical scanning system including a mirror for reflecting the scanning beam and an image rotator for scanning the optical recording tape formed without preformatted recording tracks by using the scanning beam emitted by the light source, and reflected by the mirror, the mirror positioning itself according to position data supplied thereto;

an optical reference track tape having ideal reference tracks formed thereon;

a rotary drum about which either the optical recording tape or the optical reference track tape is wound;

means for rotating said image rotator at half a rotary speed of said rotary drum, said image rotator reflecting the scanning beam to said rotary drum and said rotary drum reflecting the scanning beam to either the optical recording tape or the optical reference track tape;

means for reproducing information recorded on the ideal reference tracks and producing and storing tracking error signals therefrom;

tracking control means for controlling a scanning spot formed by the scanning beam on the optical recording tape on the basis of the stored tracking error signals, the control including supplying the position data to the mirror; and correction signal generating means for generating scanning error correcting signals used by said tracking control means to correct errors in the position of the scanning spot relative to the ideal reference tracks;

wherein the correction signals provided by the correction signal generating means are used by the tracking control means as a tracking error signals for controlling the scanning spot so that information recorded on recording tracks of the optical recording tape substantially correspond to the ideal reference tracks.

3. An optical recording apparatus according to claim 2 wherein said correction signal generating means comprises storage means capable of storing correction signals necessary for correcting at least the tracking errors corresponding to the dislocation of the scanning spot from tracks corresponding to the ideal reference tracks, that appear in one cycle of scanning operation of the rotating optical scanning system.

* * * * *